United States Patent [19]

De Koning

[11] Patent Number: 4,766,179

[45] Date of Patent: Aug. 23, 1988

[54] BISMALEIMIDE COMPOSITIONS

[75] Inventor: Adrianus J. De Koning, Sh Vlaardingen, Netherlands

[73] Assignee: DSM Resins B.V., Zwolle, Netherlands

[21] Appl. No.: 867,691

[22] Filed: May 28, 1986

[30] Foreign Application Priority Data

Jun. 8, 1985 [NL] Netherlands ........................ 8501660

[51] Int. Cl.$^4$ ............................................. C08L 79/08
[52] U.S. Cl. ................................... 525/282; 525/256; 525/262; 525/266
[58] Field of Search ............... 525/282, 205, 193, 256, 525/262, 266

[56] References Cited

U.S. PATENT DOCUMENTS 4,127,617 11/1978 Arrighetti et al. .................. 525/282

FOREIGN PATENT DOCUMENTS 108461 5/1984 European Pat. Off. .
135964 4/1985 European Pat. Off. .
WO84/02528 7/1984 PCT Int'l Appl. ................. 525/282
901386 7/1962 United Kingdom ................ 525/282

Primary Examiner—Allan M. Lieberman
Attorney, Agent, or Firm—Cushman, Darby & Cushman

[57] ABSTRACT

The invention relates to a composition comprising (A) 64–4 parts by wt. of a bismaleimide compound, or an isomaleimide isomer thereof, a maleimide-amide compound or an isomaleimide isomer thereof and maleic anhydride compound, (B) 7–77 parts by wt. of one or more ethylenically unsaturated compounds containing 5–50 C-atoms and is characterized in that the composition further comprises (C) 3–60 parts by wt. of one or more compounds from the group of hydroxy-alkylacrylates or amino-alkyla-crylates, (D) 1–20 parts by wt. of one or more terminally functional polymers as flexibilizer, with the proviso that the sum, of parts of compounds A, B, C and D amounts to 100.

13 Claims, No Drawings

BISMALEIMIDE COMPOSITIONS

FIELD OF THE INVENTION

The invention relates to new compositions containing a bismaleimide and a maleimide-amide compound, and the polymers and objects obtained with these new compositions and by curing thereof.

BACKGROUND OF THE INVENTION

It is known to apply bismaleimides and maleimide-amide compounds as bifunctional monomer or comonomer in compositions that are cured thermally by an addition reaction or via radicals. EP-A-136964 discloses a composition comprising bismaleimide and maleimide-amide compounds. The polymers and objects prepared thereof have excellent properties, such as a high HDT (heat distortion temperature) and a good resistance to hydrolysis.

A disadvantage of the products prepared on the basis of those compositions is their brittleness or low impact strength, as is apparent from, for instance, the low percentage of the elongation at break (from a tensile test). A general method for reducing the brittleness is to incorporate thermoplastics, rubbers or elastomers in the composition. To obtain a good impact strength of the fully cured polymer, it is desirable for the rubber to form a fine, properly dispersed microphase in the polymer matrix.

The bismaleimide and maleimide-amide compounds mentioned in EP-A-135964 can be polymerized both with and without comonomer. As comonomer, use can be made of a vinyl aromatic compound such as styrene. If this comonomer is used, thermoplastics, rubbers or elastomers cannot be dissolved in the mixtures containing bismaleimide and maleimide-amide without further measures being taken.

SUMMARY OF THE INVENTION

The invention relates to a composition comprising (A) 64–4 parts by wt. of a bismaleimide compound, or an isomaleimide isomer thereof, a maleimide-amide compound or an isomaleimide isomer thereof and maleic anhydride compound, (B) 7–77 parts by wt. of one or more ethylenically unsaturated compounds containing 5–50 C-atoms and is characterized in that the composition further comprises (C) 3–60 parts by wt. of one or more compounds from the group of hydroxy-alkylacrylates or amino-alkylacrylates, (D) 1–20 parts by wt. of one or more terminally functional polymers as flexibilizer, with the proviso that the sum, of parts of compounds A, B, C and D amounts to 100.

The composition according to the invention comprises

A: 4–64 parts by wt. of a mixture of:

(a) 80 to 30 wt.% of one or more compounds of the general formula:

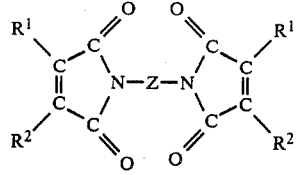

or the corresponding isomaleimide isomer, where $R^1$ and $R^2$ each and independently represent a hydrogen atom, an aliphatic, cycloaliphatic or aromatic group containing 1–12 carbon atoms, or a halogen atom, or where $R^1$ and $R^2$, together with the carbon atoms to which they are bound, form a ring system with at least one polymerizable C=C bond, and Z represents an optionally halogen, hydroxyd or nitro substituted alkylene group containing 2–25 carbon atoms, an optionally halogen or nitro substituted meta- or paraphenylene group, or an optionally halogen or nitro substituted group having the formula

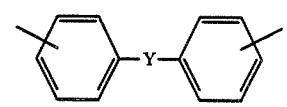

where Y represents a —$CH_2$—, a —$C(CH_3)_2$—, a —O— or a —$SO_2$— group;

(b) 5 to 60 wt.% of one or more compounds of the general formula:

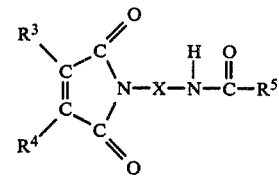

or a corresponding isomaleimide isomer thereof, where $R^3$ and $R^4$ each and independently represent a hydrogen atom, an aliphatic, cycloaliphatic or aromatic group containing 1–12 carbon atoms, or a halogen atom, or where $R^3$ and $R^4$, together with the carbon atoms to which they are bound, form a ring system with at least one polymerizable C=C bond, X represents an optionally halogen, hydroxy or nitro substituted alkylene groups containing 2–25 carbon atoms, an optionally halogen or nitro substituted meta- or paraphenylene group, or an optionally halogen or nitro substituted group having the formula

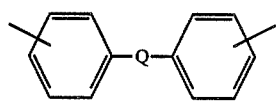

where Q represents a —$CH_2$—, a —$C(CH_3)_2$—, a —O— or a —$SO_2$— group; and $R^5$ represents an alkyl, cycloalkyl, aryl, aralkyl or alkylaryl group, with 1–12 carbon atoms in which the alkyl part may be substituted with one or more halogen, hydroxide or nitro groups;

(c) 1 to 10 wt.% of a maleic anhydride compound having the formula:

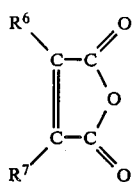

where R⁶ and R⁷ each and independently represent a hydrogen atom, an aliphatic, cycloaliphatic or aromatic group containing 1-12 carbon atoms, or a halogen atom, or where R⁶ and R⁷, together with the carbon atoms to which they are bound, form a ring system with at least one polymerizable C=C bond, with the proviso that the sum of the wt.-% of (a)+(b)+(c) is 100 wt.%.

B: 7-77 parts by wt. of one or more ethylenically unsaturated compounds with 5-50 C-atoms, characterised in that the composition further comprises C: 3-60 parts by wt. of one or more compounds from the group of hydroxyalkyl(meth)acrylates or aminoalkyl(meth)acrylates, D: 1-20 parts by wt. of one or more terminally functional polymers as flexibilizer, with the proviso that the sum of parts of compounds A+B+C and D amounts to 100.

It has, surprisingly, been found that, when using a hydroxyalkyl(meth)acrylate or aminoalkyl(meth)acrylate in the compositions containing bismaleimide, maleimide-amide, and polymerizable monomeric compounds like styrene, terminally functional polymers as flexibilizer indeed can be incorporated homogeneously.

The compounds A that contain at least 5 wt. % of one or more maleimide-amide compounds can be prepared in a very convenient manner by the following method:

A diamine having the formula $$H_2N-Z-NH_2 \quad\quad VI$$

where Z has the meaning indicated, is reacted with a maleic anhydride compound having formula V in a molar ratio of diamine to maleic anhydride compound of 1:0.75 to 1:2.5 and in that the mixture obtained is subsequently reacted, in the presence of a suitable catalyst, with an adapted amount of anhydride of an alkylcarboxylic acid with 2 to 7 carbon atoms, whereupon a mixture is obtained showing the desired ratio between (iso)maleimide groups formed by cyclodehydration, the amount of alkylamide groups formed by (re-)alkylamidation and the amount of acid anhydride compound.

For the preparation of homogeneous, curable compositions with ethylenically unsaturated compounds it is not necessary to separate the components from the mixture obtained. Removal of solvent used, alkylcarboxylic acid formed and possibly an excess of alkylcarboxylic anhydride is sufficient.

In the mixtures thus obtained, mostly about 30-50% of the maleimide groups will be present in the isomeric isomaleimide form. The mixture thus will mainly contain bismaleimide, maleimideisomaleimide and bisisomaleimide compounds (collectively called bismaleimide compounds), maleimide-amide and isomaleimide-amide compounds (collectively called maleimide-amide compounds) and maleic anhydride compounds. Moreover, depending on the reaction conditions, small amounts (up to about 5%) of amide-amide compounds may be present and possibly, to an even more limited extent, compounds with amide acid groups.

Said compositions, that comprise bismaleimide compounds, maleimide-amide compounds and acid compounds, appear to be soluble as such in simple solvents such as acetone or methylethylketone, but also in ethylenically unsaturated compounds.

Solutions in copolymerizable ethylenically unsaturated compounds with 5-50 C-atoms comprise bismaleimide compounds, maleimide-amide compounds and an acid anhydride compound, in such an amount that the weight ratio between ethylenically unsaturated compound and composition A is 2:1 and 1:4, Ethylenically unsaturated compounds are here particularly understood to mean vinyl aromatic compounds such as: styrene, α-methylstyrene, para-methylstyrene, divinylbenzene, vinyltoluene; allyl compounds such as monoallyl esters or ethers and diallyl esters or ethers, for instance diallyl phthalate; vinylether and vinylester compounds such as vinyl benzoate; and acrylic acid esters and methacrylic acid esters.

The flexibilizer can be added after synthesis of composition A, but also previously. In the latter case, the amount of component C needed for obtaining a homogeneous mixture generally can be smaller, also higher amounts of flexibilizer can be added. Furthermore, the viscosity of the mixture is lower in case the flexibilizer is added before synthesis of compound A.

If the bismaleimide and maleimide-amide mixture is cured without vinylic comonomer, it is particularly advantageous to add the terminally functional polymer during the synthesis of composition A. This yields a very good end product, which is particularly suitable for prepregs.

During polymerization or curing by addition reactions or via radical reactions, the terminal functional polymers react with the (iso)maleimide-containing components, so that these become part of the matrix. It also is possible that a portion of the terminally functional compound reacts with other components of the composition to yield modified prepolymers already before the eventual curing process. These prepolymers, too, are compatible with the bismaleimide and maleimide-amide containing composition according to the invention.

Examples of hydroxyalkyl(meth)acrylates or aminoalkyl(meth)acrylates are 2-hydroxy-ethylmethacrylate, 2-hydroxypropylmethacrylate, 2-hydroxyethylacrylate and 2-dimethylamino-ethylmethacrylate; particularly the hydroxyalkyl(meth)acrylates are suitable, preference being given to 2-hydroxyethylmethacrylate. By preference, a compound from this group is applied in the composition in an amount of 5-40 wt.%, in particular 6-30 wt.%.

As flexibilizer a wide variety of polymers can be applied. It is essential for these to possess a terminally functional group suitable for an addition or radical polymerization reaction. By preference, use is made of mainly linear polymers that are amino-, amide hydroxy-, isocyanate-, carboxyl-, epoxy- or vinyl-terminated polymers, preferably with a molecular weight between 400 and 20,000, more preferably between 500 and 5000, particularly aminoterminated polymers. The flexibilizers are preferably applied in the composition in an amount between 4 and 16 wt.%. The polymer itself can be constituted of various sorts of organic monomers like ethyleneglycol, propyleneglycol, tetrahydrofuran, butadiene, acrylonitrile, and mixtures thereof. Even better results can be achieved using fluoridized rubbers or polysiloxanes that are provided with a terminally functional group. Also hydroxylated or carboxylated EPDM rubbers can be applied. These types of rubber do have a molecular weight, preferably between 10,000 and 100,000.

It further is to a limited extent possible to add customary substances such as inhibitors, pigments, fillers, reinforcing agents, shrinkage-controlling substances, etc. Examples of possible additives are glass fibres, carbon fibres, metal fibres, aramide fibres, chalk, lime, sand, silica, aluminium oxide hydrate, polybutadiene, polystyrene, polyethylene, polypropylene and polyacrylates. For curing a radical source can be added. As such, a hydroperoxide, a perester, a perketone, and/or another compound that is suitable for curing a styrene containing mixture with copolymers. Otherwise, it is also possible to induce curing e.g. by ultra-violet light, optionally with an initiator.

The polymers or objects obtained by curing of compositions according to the invention are characterized by a lower brittleness, with a relatively small adverse effect on the chemical, physical and thermal properties.

The invention will be elucidated with reference to the following examples, without being restricted to the embodiments described therein.

EXAMPLE I

Preparation of a composition containing a 'bismaleimide', a 'maleimide-amide compound' and an acid anhydride compound At room temperature a solution of 100 g 4,4'-diaminodiphenylmethane in 300 ml acetone is added dropwise to 100 g maleic anhydride dissolved in 700 ml acetone. A precipitate of the corresponding dimaleimidic acid is formed quantitatively. At 60° C. 150 g acetic anhydride and 1.5 g DABCO (1,4-diaza-bicyclo-(2,2,2)-octane) is added; the anhydride serves as water extraction agent and the amine as catalyst. The end of the reaction is characterized by complete disappearance of the diamido-acid precipitate. After removal under vacuum 13.3 N/m² (0.1 mm Hg) of the solvent, acetic acid and acetic anhydride at 50°–100° C., in a quantitative yield a mixture is obtained that consists of approx. 70 wt.-% N,N',4,4'-diphenylmethane-bismaleimide, 25 wt.-% 4-acetylaminophenyl 4'-maleimidophenylmethane and approx. 5 wt.-% maleic anhydride and minor amounts of N,N',4,4'-diphenylmethane bisacetamide. In this mixture, about 40 wt.-% of the 'maleimide' groups is present in the isomeric isomaleimide form and 60 wt.-% in the maleimide form. This mixture is eminently suitable as basic ingredient for the preparation of thermosetting resins.

EXAMPLE II

Preparation of a homogeneous curable resin composition and curing thereof to a copolymer object A reaction vessel, provided with a stirrer and placed in a bath that is kept at a temperature of 80°–100° C. by means of a thermostat, is charged with amounts as specified in Table 1 (resins 1–3) of the composition according to Example I, styrene, 2-hydroxymethylmethacrylate and in each resin a different type of a functional terminal polymer. The mixture is stirred during 10–15 minutes, upon which a clear, transparent, reddish solution is obtained. Stabilized with 300 ppm benzoquinone, the solution remains homogeneous also after cooling to 15°–20° C.

After dearation of the solution and addition of 1 wt.-% methyl ethyl ketone peroxide (50 wt.-% solution in dimethylphthalate), the resin is poured into a rectangular metal mould (130×75×4 mm). Curing takes place at room temperature, the gelation time is about 1 hour. After 8 hours, the plate obtained is kept at a temperature of 80° C. for 24 hours, then at a temperature of 150° C. for 24 hours and finally at a temperature of 200° C. for 24 hours. The mechanical properties of these cast objects are presented in Table 1.

It is clear that objects containing the amino-terminated polymer are considerably less brittle than the unmodified products. It is remarkable to note that the addition of the reported amounts of flexibilizer does not have any adverse consequences for the HDT (heat distortion temperature) of the material.

TABLE A

| 1. Composition of the bismaleimide resins in wt. % | | | | |
|---|---|---|---|---|
| Resin | BMI-solid of Ex. I | Styrene | 2-Hydroxyethyl-methacrylate | NH₂—terminated polymer on the basis of |
| A* | 66 | 34 | | |
| B* | 58 | 29 | 13 | |
| 1 | 53 | 23 | 20 | 4 polybutadiene acrylonitrile |
| 2 | 52 | 25 | 18 | 5 polypropylene oxide (MW 2000) |
| 3 | 52 | 30 | 13 | 5 polytetrahydrofuran (MW 1100) |

| 2. Mechanical properties of the cured products | | | | | |
|---|---|---|---|---|---|
| Properties | A* | B* | 1 | 2 | 3 |
| E-modulus from flexural test (ASTM D 790) in GPa | 3.3 | 2.9 | 2.8 | 2.6 | 2.6 |
| Flexural strength (ASTM D 790) in MPa | 55 | 87 | 95 | 98 | 97 |
| Flexure at break from flexural test (ASTM D 790) in % | 1.9 | 3.2 | 3.9 | 4.6 | 4.3 |
| E-modulus from tensile test (ASTM 638-1) in MPa | ** | ** | 3.5 | 3.3 | 3.5 |
| Tensile strength (ASTM 638-1) in MPa | ** | ** | 51 | 65 | 52 |
| Elongation (ASTM 638-1) in % | <0.5 | <0.5 | 1.6 | 2.4 | 1.8 |
| HDT (ASTM 648) in °C. | 190 | 225 | 245 | 237 | 232 |
| Barcol hardness (GYZJ 934-1) | 52 | 54 | 45 | 46 | 47 |

*Comparative experiments
** The elongation being to low, these values cannot be measured in a reliable way.

EXAMPLE III

In analogous way to examples I and II resins 4–14 were prepared and tested, results are shown in Table 2.

TABLE 2

1. Composition of the bismaleimide resins in wt. %

| Resin | BMI-Solid of exp. I | Styrene | 2-Hydroxyethyl-methacrylaat | NH$_2$—terminated polymer on the basis of |
|---|---|---|---|---|
| 4 | 52 | 25 | 18 | 5 tetrahydofuran (Mw 750) |
| 5 | 52 | 23 | 18 | 7 tetrahydofuran (Mw 750) |
| 6 | 52 | 25 | 18 | 5 tetrahydofuran (Mw 1100) |
| 7 | 52 | 30 | 13 | 5 tetrahydofuran (Mw 1100) |
| 8 | 50 | 24 | 20 | 6 polybutadieenacrylonitrile |
| 9 | 53 | 21 | 18 | 5 polypropyleneglycol (Mw 480) 3 polypropyleneglycol (Mw 2000) |
| 10 | 53 | 19.5 | 19.5 | 5 polyethyleneglycol/ propyleneglycol (Mw 900) 3 polypropylene glycol (Mw 2000) |
| 11 | 52 | 25 | 18 | 5 polypropylene glycol (Mw 2000) |
| 12 | 52 | 35 | 8 | 5 polypropylene glycol (Mw 2000) |
| 13 | 52 | 30 | 13 | 5 polypropylene glycol (Mw 2000) |
| 14 | 53 | 24 | 18 | 5 polyethylene glycol/poly-propylene glycol (Mw 2000) |

2. Mechanical properties

| Resin | HDT °C. | Elongation at break (%) | Flexure at break (%) |
|---|---|---|---|
| 4 | 232 | 1.7 | 4.2 |
| 5 | 220 | 1.9 | 4.5 |
| 6 | 242 | 1.9 | 4.5 |
| 7 | 232 | 1.2 | 4.3 |
| 8 | 237 | 1.3 | 4.5 |
| 9 | 200 | 2.5 | 3.9 |
| 10 | 203 | 2.2 | 3.4 |
| 11 | 237 | 2.6 | 4.6 |
| 12 | 235 | 2.2 | 2.2 |
| 13 | 240 | 2.8 | 3.8 |
| 14 | 221 | 1.7 | 3.6 |

EXAMPLE IV

In situ preparation of a composition containing a 'bismaleimide', a 'maleimide-amide', an acid anhydride and a functional terminal polymer Instead of adding a flexibilizer to the maleimide composition obtained according to Example I, the flexibilizer modification can also be integrated with the synthesis of the maleimide composition.

A solution of 100 g 4,4'-diamino-diphenylmethane and 17.5 g NH$_2$-terminated polypropylene oxide (MW 2000) in 300 ml acetone is added dropwise at room temperature to 105 g maleic anhydride dissolved in 700 ml acetone. A quantitative precipitate of the corresponding diamido acids is formed. At 60° C. 150 g acetic anhydride and 1.5 g DABCO (1,4-diaza-bicyclo-(2,2,2)-octane) is added; the anhydride serves as water extraction agent and the amine as catalyst. The end of the reaction is characterized by complete dissappearance of the precipitate.

Further treatment of the mixture is as described in Example I. The composition thus obtained contains about 10 wt.% flexibilizer.

A resin (number 15) on the basis of 57 wt.% of composition thus prepared, 25 wt.% styrene and 18 wt.% 2-hydroxyethylmethacrylate yields cured products having virtually the same mechanical properties of those of resin 2 of Example II.

EXAMPLE V

In analogous way to example IV resins 16–20 were prepared and tested. Results are shown in table 3.

TABLE 3

1. Composition of the bismaleimide resin in wt. %

| Resin | BMI-Solid of exp. III* | Styrene | 2-Hydroxyethyl-methacrylaat | NH$_2$—terminated polymer on the basis of |
|---|---|---|---|---|
| 16 | 53 | 28.5 | 13 | 5.5 tetrahydrofuran (Mw 2100) |
| 17 | 52 | 24 | 18 | 6 polybutadieneacrylonitrile |
| 18 | 35 | 25 | 25 | 15 polyethyleneglycol/poly-propyleneglycol (Mw 600) |
| 19 | 35 | 25 | 25 | 15 polyethyleneglycol/poly-propyleneglycol (Mw 900) |
| 20 | 35 | 25 | 25 | 7.5 polypropyleneglycol (Mw 400) 7.5 polypropyleneglycol (Mw 2000) |

2. Mechanical properties

| Resin | HDT °C. | Elongation at break (%) | Flexure at break (%) |
|---|---|---|---|
| 16 | 227 | 1.8 | 3.8 |
| 17 | 220 | 1.8 | 3.0 |
| 18 | 129 | 1.9 | 3.9 |
| 19 | 119 | 2.8 | 3.7 |

TABLE 3-continued

| 20 | 135 | 2.3 | 3.5 |

*In this column, the real amount of BMI solid (calculated) in the ultimate composition is shown.

As is clear from the results with resins 1–17 the heat distortion temperature (HDT) is higher or equals 200° C., as long as more than 50 wt.-% BMI-solid is used. In examples 18–20 the amount of BMI solid is lowered to 35 wt.-% which has a lower HDT as a result.

EXAMPLE VI

In an analogous way to example I and II resin 21 was prepared with an OH-terminated rubber based on polyethyleneglycol (PEG) with the following composition: BMI-resin:styrene:HEMA: PEG=50 wt.%; 27 wt.-%; 18 wt.-%, 5 wt.-%.

The HDT was 225° C., the elongation at break amounted to 1.6%.

I claim:
1. A composition comprising:
A: 64–4 parts by weight of:
(a) 80–30 weight percent of one or more compounds of the formula

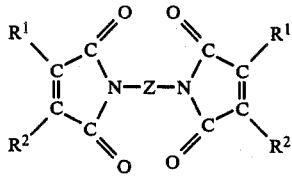

I or a corresponding isomaleimide isomer thereof, wherein
$R^1$ and $R^2$ each independently represent hydrogen; an aliphatic, cycloaliphatic or aromatic group, containing 1–12 carbon atoms; or halogen; or $R^1$ and $R^2$ together with the carbon atoms to which they are attached form a ring system with at least one polymerizable C=C bond, and
Z represents alkylene containing 2–25 carbon atoms; alkylene containing 2–25 carbon atoms and substituted by halogen, hydroxide or nitro; meta- or paraphenylene group; meta- or paraphenylene group substituted by halogen or nitro; a group having the formula

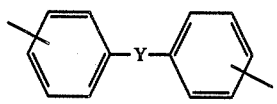

II wherein Y represents —CH$_2$—, —C(CH$_3$)$_2$—, —O— or —SO$_2$—; or a group having the formula

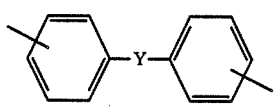

II wherein Y represents —CH$_2$—, —(CH$_3$)$_2$—, —O—, or —SO$_2$— and substituted by halogen or nitro;

(b) 5 to 60 weight percent of one or more compounds of the formula

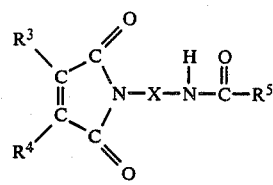

III or a corresponding isomaleimide isomer thereof, wherein
$R^3$ and $R^4$ each independently represent hydrogen; an aliphatic, cycloaliphatic or aromatic group, containing 1–12 carbon atoms; or halogen; or $R^3$ and $R^4$ together with the carbon atoms to which they are attached form a ring system with at least one polymerizable C=C bond,
X represents alkylene containing 2–25 carbon atoms; alkylene containing 2–25 carbon atoms and substituted by halogen, hydroxide or nitro; meta- or paraphenylene group; meta- or paraphenylene group substituted by halogen or nitro; a group having the formula

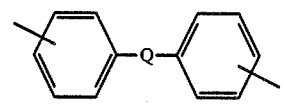

IV wherein Q represents —CH$_2$—, —C(CH$_3$)$_2$—, —O— or —SO$_2$; a group having the formula

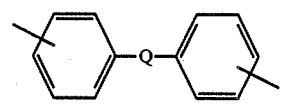

IV wherein Q represents —CH$_2$—, —C(CH$_3$)$_2$—, —O— or —SO$_2$ and substituted by halogen or nitro; and
$R_5$ represents alkyl, cycloalkyl, aryl, aralkyl or alkylaryl, having 1–12 carbon atoms; or alkyl cycloalkyl, aryl, aralkyl or alkylaryl, having 1–12 carbon atoms and wherein the alkyl moiety is substituted by one or more of halogen, hydroxide or nitro;
(c) 1 to 10 weight percent of a maleic anhydride compound having the formula:

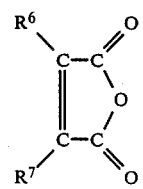

V wherein $R^6$ and $R^7$ each independently represent hydrogen; an aliphatic, cycloaliphatic or aromatic group, containing 1–12 carbon atoms; or halogen; or $R^6$ and $R^7$ together with the carbon atoms to which they are attached form a ring system with at least one polymerizable C=C bond, with the proviso that the sum of the weight percentages of (a)+(b)+(c) is 100 weight percent;

B: 7-77 parts by weight of one or more ethylenically unsaturated compounds containing 5-50 carbon atoms, said ethylenically unsaturated compounds being selected from the group consisting of vinyl aromatic compounds, allyl compounds, vinyl ether and vinyl ester compounds, acrylic acid esters and methacrylic acid esters;

C: 3-60 parts by weight of one or more hydroxy-alkylacrylates or amino-alkylacrylates; and D: 1-20 parts by weight of one or more terminally functional polymers as flexibilizer, said terminally functional polymers being selected from the group consisting of amino-, hydroxy-, isocyanate-, carboxyl-, and vinyl-terminated polymers;

with the proviso that the sum of the parts by weight of A, B, C and D is equal to 100.

2. Composition according to claim 1, characterized in that component C is at least one compound from the group of hydroxy-alkylacrylates.

3. Composition according to claim 2, characterized in that component C is 2-hydroxyethylmethacrylate.

4. Composition according to claim 1, characterized in that the composition contains 5-40 parts by wt. component C.

5. Composition according to claim 4, characterized in that the composition contains 6-30 parts by wt. component C.

6. Composition according to claim 1, characterized in that component D is at least one aminoterminated polymer.

7. Composition according to claim 1, characterized in that the composition contains 4-16 parts by wt. of component D.

8. Composition according to claim 1, characterized in that component B is styrene.

9. Polymer composition characterized in that it comprises a partly or completely polymerized composition according to claim 1.

10. Object characterized in that it comprises a cured composition according to claim 1.

11. The composition according to claim 2, wherein said composition contains:
5-40 parts by weight component C; and
4-16 parts by weight component D.

12. The composition according to claim 1, wherein component B is styrene.

13. The composition according to claim 1, wherein component C is 2-hydroxyethylmethacrylate.

* * * * *